June 23, 1970 E. ANDRÉ 3,516,680
DEVICE FOR CLAMPING ARTICLES TO BE MACHINED
Filed July 24, 1967 4 Sheets-Sheet 1
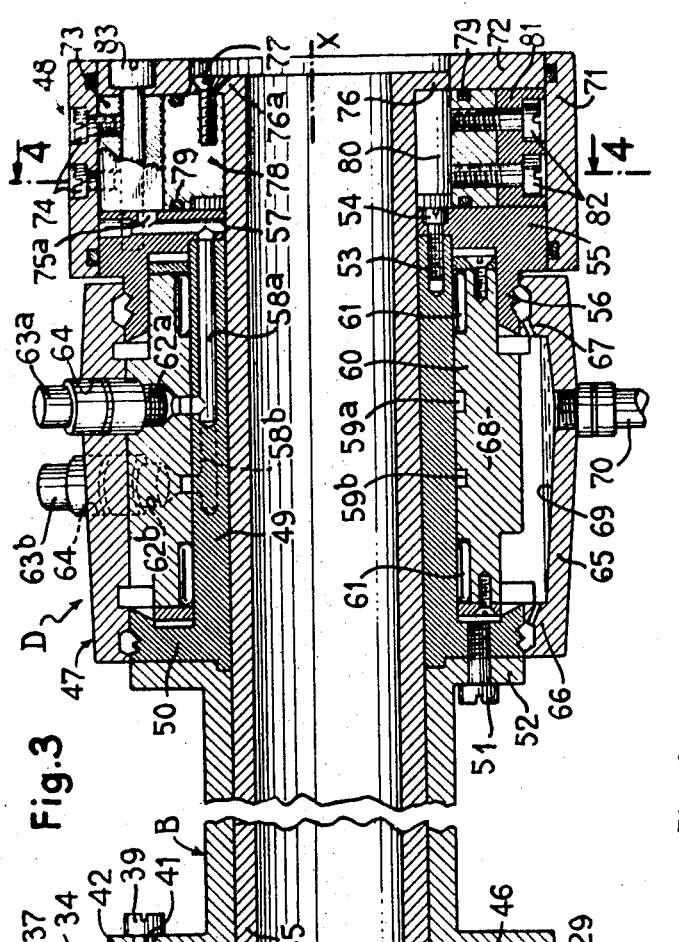
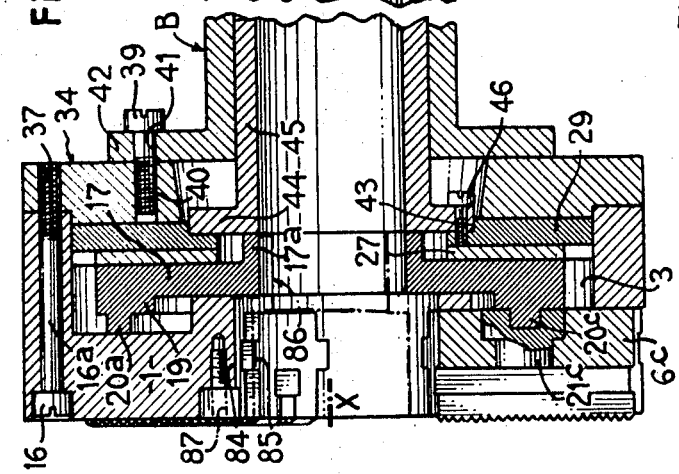
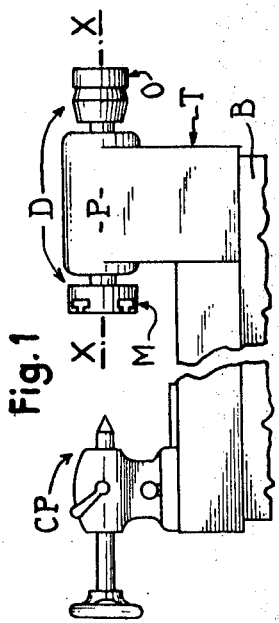
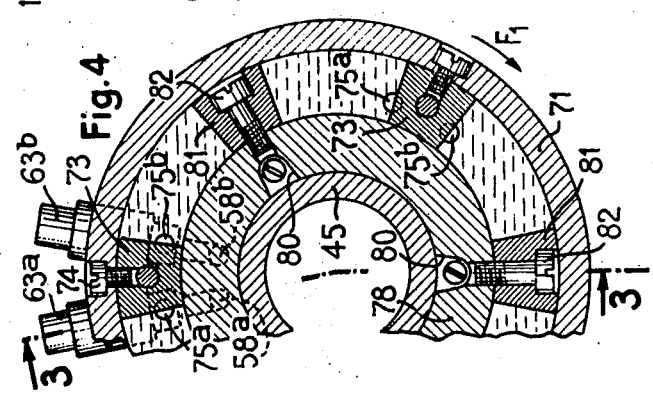
Inventor:
Edmond André

Inventor:
Edmond André

June 23, 1970  E. ANDRÉ  3,516,680
DEVICE FOR CLAMPING ARTICLES TO BE MACHINED
Filed July 24, 1967  4 Sheets-Sheet 3

Inventor:
Edmond André

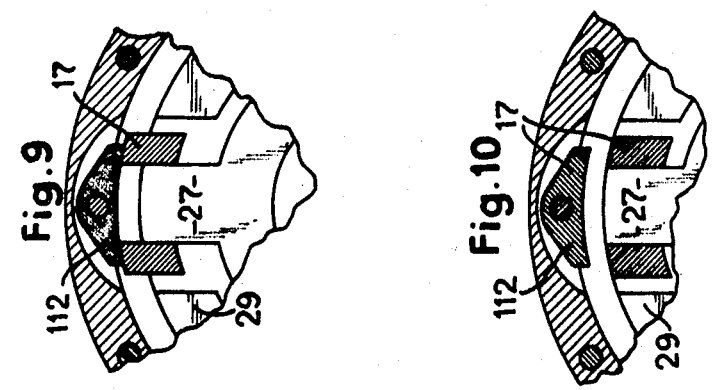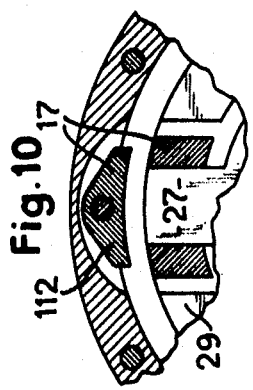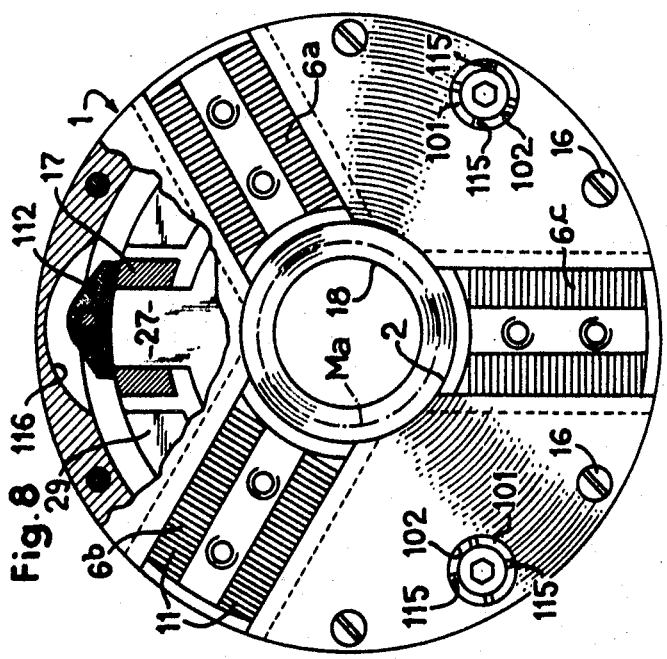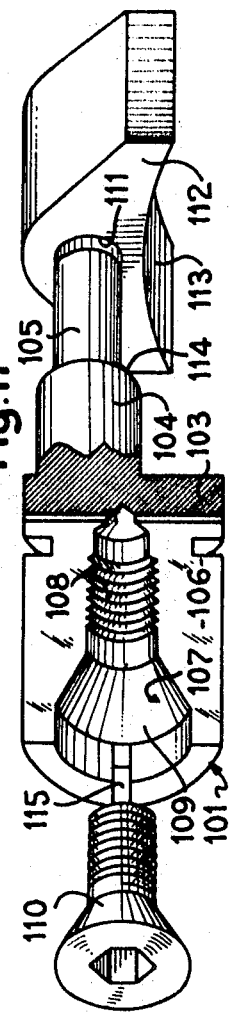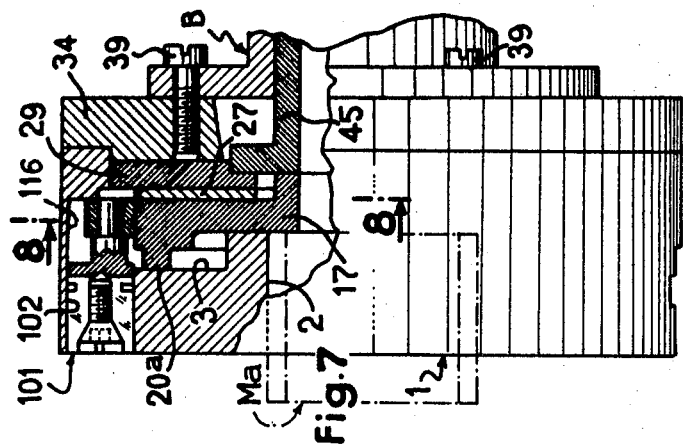

United States Patent Office 3,516,680
Patented June 23, 1970

3,516,680
DEVICE FOR CLAMPING ARTICLES TO BE MACHINED
Edmond André, 56 Rue Henri Richaume, 78 Montesson, France
Filed July 24, 1967, Ser. No. 655,532
Claims priority, application France, July 29, 1966, 71,389; July 21, 1967, 115,234
Int. Cl. B23b 31/30, 31/16
U.S. Cl. 279—4
6 Claims

ABSTRACT OF THE DISCLOSURE

Clamping device for clamping articles to be machined on machine tools, the device comprising at least one radially slidable clamping dog which is radially shiftable by means including a rib in the shape of an arc of a spiral provided on a control plate and a cylindrical element slidable on the rib and rotatably engaged in the dog.

---

The present invention relates in a general way to machine tools and in particular to a device for clamping articles or work-pieces to be machined on these machine tools, the article being machined by a movement of rotation thereof or being rigidly secured relative to the machine, in which case the tool moves relative to the article.

The object of the invention is to provide in particular a clamping device having a very small number of component parts, high precision and long life relative to known clamping devices. The device is capable of clamping articles having an axis which is, or is not, concentric to the axis of the clamped part.

The clamping device according to the invention comprises a rigid body having a centre opening, at least one clamping jaw located in a radial recess in said body and radially slidable relative to the axis of said opening, a control plate freely disposed in a cavity in said body and having a centre opening communicating with said opening in said body, said plate having at least one rib in the shape of an arc of a spiral on which is slidable a cylindrical element which is inserted in a cylindrical aperture in said jaw, the axis of said aperture being parallel to the axis of said opening in the body, and control means integral with said control plate for imparting thereto a movement of rotation about the axis of said body and relative to the latter, whereby said rotation shifts said rib relative to said cylindrical element and said cylindrical element is shifted radially and radially shifts said jaw.

According to one embodiment of the invention, said control plate is located between the bottom of said cavity and a support ring whose axis is parallel to the axis of said body, said ring being freely rotatable in said cavity and having two diametral recesses in which are inserted respectively a pair of radial lugs of a ring which is connected to rotate with said control plate and diametrally opposed projecting portions formed on the face of the control plate opposed to said ribs, angular play being provided between the projecting portions and said diametral recesses.

Said control means can be hydraulic, pneumatic, or electric. According to a preferred embodiment of the invention, said control means are hydraulic and comprise a ring which is connected to rotate with said control plate, said ring having radial projecting portions defining annular chambers with which passageways for oil under pressure communicate.

According to a preferred embodiment of the invention, the clamping device comprises centering means comprising at least one crank journalled in said body of the clamping device and having an eccentric bearing face on which is rotatably mounted a positioning shoe provided with a support face which cooperates with the peripheral edge of said control plate, said crank having locking means for maintaining the crank stationary relative to said body.

Preferably, said cranks are three in number and are evenly spaced apart on the periphery of said body.

The clamping device according to the invention permits the clamping of articles or work-pieces to be machined on machine tools on which said article undergoes a movement of rotation or on machines relative to which the article is stationary. Among the machine tools which can be provided with this clamping device there may be mentioned for example lathes, grinders, milling machines, sharpening machines, boring machines, and drilling machines.

Further features and advantages of the invention will be apparent from the ensuing description with reference to the accompanying drawings.

In the drawings:

FIG. 1 is a partial elevational view of the assembly of a lathe provided with a clamping device according to one embodiment of the invention;

FIG. 3 is a partial sectional view of the assembly of the clamping device;

FIG. 4 is a sectional view taken on line 4—4 of FIG. 3;

FIG. 7 is an elevational view, partly in section, of a clamping chuck including cranks for positioning the control plate according to the invention;

FIG. 8 is a front elevational view of the chuck, partly in section on line 8—8 of FIG. 7, showing the positioning shoe in the clamping position;

FIGS. 9 and 10 are detail views similar to FIG. 8 showing respectively the position of the positioning shoes in respect of an eccentric and "floating" control plate, and FIG. 11 is an exploded perspective view on an enlarged scale and partly in section, of a positioning crank according to the invention.

FIGS. 1-6 show a clamping device according to a first embodiment of the invention in which the whole of the device undergoes a movement of rotation about a general axis X—X.

This embodiment is consequently particularly suitable for machines in respect of which it is necessary that the article to be machined rotate about a general axis, for example lathes or grinders. However, it is possible to employ the clamping device on other machine tools even if in respect of these machine tools the article or work, to be machined does not undergo a movement of rotation during the machining, for example milling, sharpening, boring or drilling machines.

Moreover, the clamping device is of particular utility for articles having an irregular surface of revolution. However, as will be understood hereinafter, various embodiments are possible for achieving several clamping effects without departing from the scope of the invention.

FIG. 1 shows partly in elevation a lathe T comprising a bed S resting on the ground, a fixed headstock P, a loose head stock CP and, according to the invention, a clamping device D located on the general turning axis X—X and including a clamping or gripping chuck M and control means O (FIGS. 1 and 3).

Figure 2:
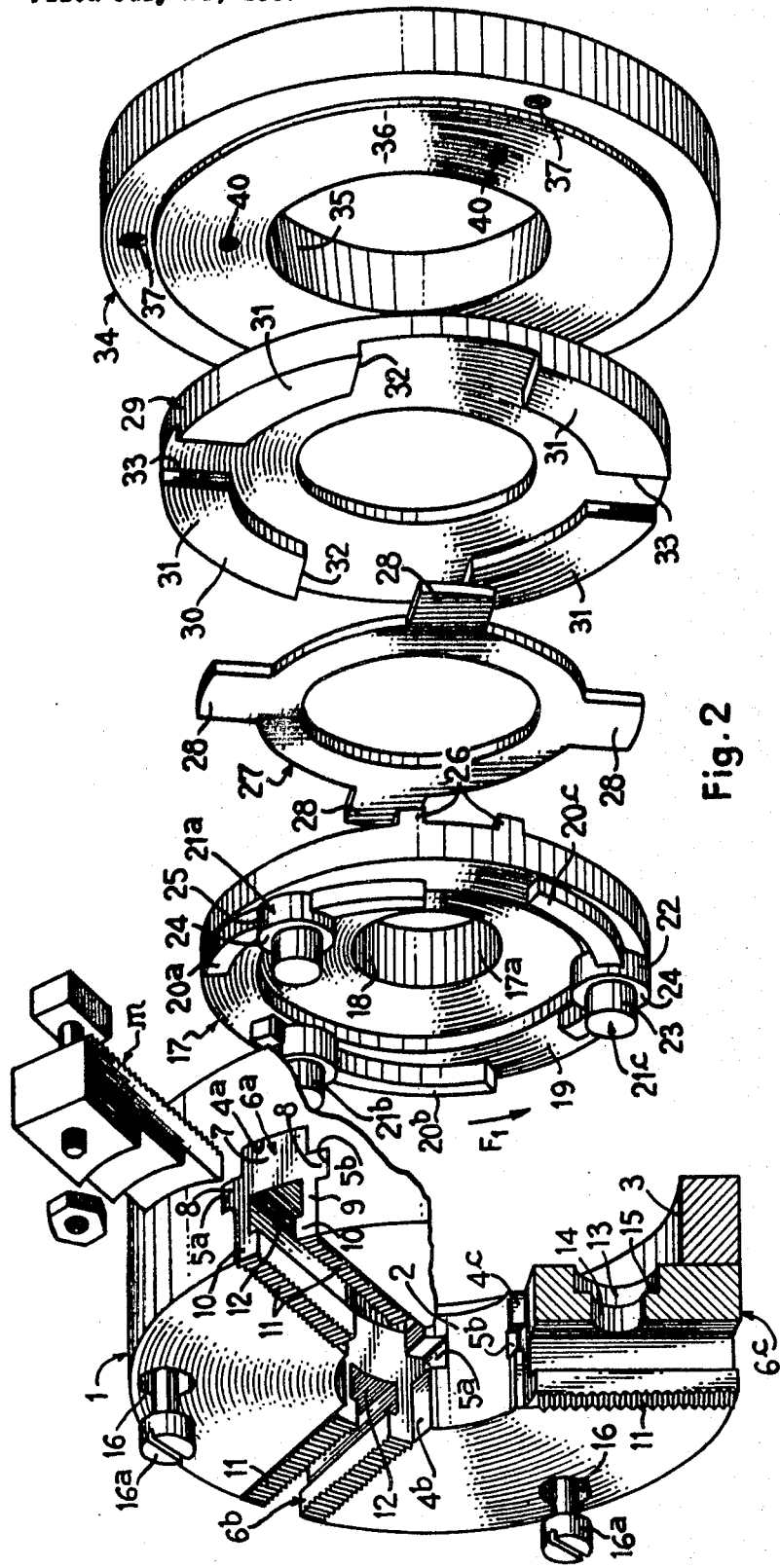
FIG. 2 is an exploded perspective view of the clamping chuck of the lathe shown in FIG. 1.
Figure 6:
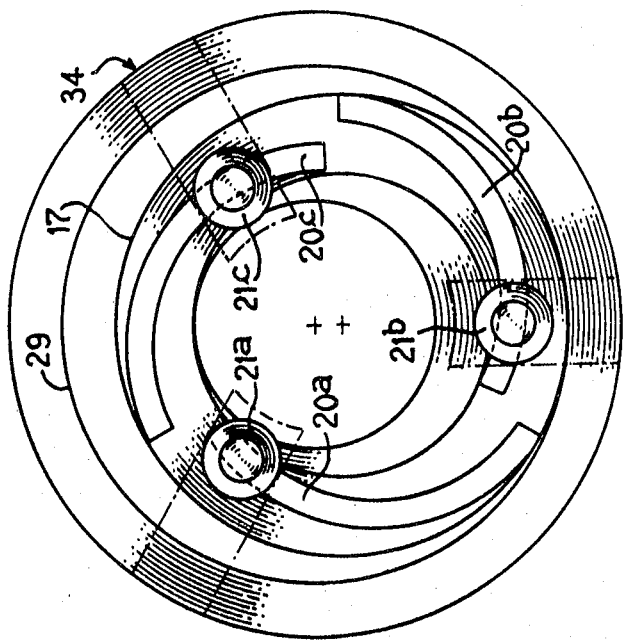
FIGS. 5 and 6 are diagrammatic views illustrating the operation of the clamping device.
Figure 5:
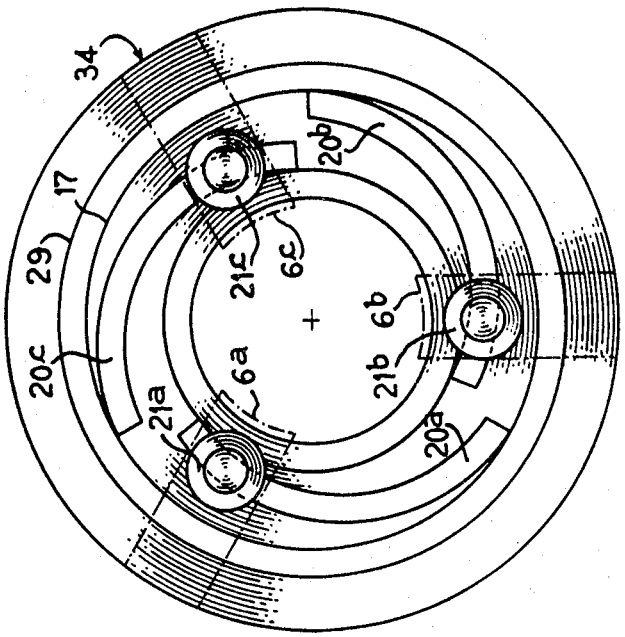

With reference to FIG. 2, the clamping chuck comprises a cylindrical body 1 in which are machined coaxially a bore 2 and a cylindrical cavity 3. The body also comprises three radial recesses $4^a$, $4^b$, $4^c$, which are angularly spaced 120° apart, each recess having in the sides thereof two longitudinal grooves $5^a$, $5^b$.

Parts, termed jaw carriers, $6^a$, $6^b$, $6^c$ are radially slidable in each recess $4^a$, $4^b$, $4^c$. Each jaw carrier has an elongated base 7, two elongated projecting portions 8 and two lateral walls 9 which terminate at their outer end in a reinforced ledge 10. Each ledge 10 comprises on its outer face grooves 11 which extend in a direction perpendicular to the walls 9. Jaws or dogs m can be inserted in recesses 12 formed in the jaw carriers in the well-known manner.

Further, the base 7 of each jaw carrier has two successive cylindrical bores 13, 14 defining a shoulder 15. The axes of these bores are parallel to the general axis X—X of the device.

The body 1 further comprises three apertures 16 for receiving screws $16^a$, as will be explained hereinafter.

A control plate 17 is disposed in the cylindrical cavity 3 of the body 1. This plate comprises a centre opening 18 and a peripheral ring or flange 19 which faces the bottom of the cavity 3. Three ribs $20^a$, $20^b$, $20^c$, in the shape of an arc of a spiral and having a rectangular cross-sectional shape throughout their length, are provided on the ring 19, these ribs being evenly spaced apart on the latter.

The plate 17 is completed by a cylindrical skirt $17^a$. Cylindrical elements or blocks $21^a$, $21^b$, $21^c$, cooperate with each of the ribs $20^a$, $20^b$, $20^c$ and each comprises two cylindrical portions 22, 23 of different diameters so as to define a shoulder 24. A recess 25 is formed in each cylindrical element, the dimensions of this recess being such that the element is freely slidable on the associated rib.

The other face of the control plate 17 comprises two pairs of fingers 26 which are diametrally opposed and project from this face. A ring 27 having radial tabs 28 angularly spaced 90° apart, co-operates with the plate 17 and with another plate 29. The latter comprises on the face thereof facing the bottom of the cavity 3 a ring 30 which is integral with the plate 29 and divided into four segments 31 which define pairs of cavities 32 and 33. Each pair of cavities acts as a radial recess. The recesses 32 receive the corresponding fingers 26 of the control plate 17 with provision of clearance. A pair of tabs 28 of the ring 27 are inserted between the associated pair of fingers 26 and the recesses 33 receive tabs 28 with no angular or circumferential play.

The clamping chuck M is completed by a closing and driving wall 34 having an opening 35 (FIG. 2). An annular portion 36 projects from the wall 34 and acts as a bearing face for the plate 29. Three tapped holes 37 coincide with the apertures 16 provided in the body 1. The chuck is held by screws $16^a$ which extend into the apertures 16, the heads of the screws being completely inserted in counterbores 38 (FIG. 3) if desired.

As shown in FIG. 3, the closing and driving wall is integral with the spindle B of the lathe owing to the provision of three screws 39 which are screwed in tapped holes 40 formed in the wall 34 and extend through apertures 41 provided in a flange 42 integral with the spindle B. The latter is supported in a fixed headstock P of the lathe (FIG. 1).

The plate 29 (FIG. 3) is provided with an annular shoulder 43 on which bears a flange 44 of a control sleeve 45 which extends through the spindle B and is freely rotatable in the latter about the axis X—X of the assembly. The flange 44 and the plate 29 are interconnected by screws 46.

The assembly just described is located at one end of the fixed headstock P (on the left side of the lathe as viewed in FIG. 1). Control means O is located on the other side of the headstock P.

This control means comprises an oil distributor, generally designated by the reference numeral 47, and a control device 48 located at the free or rear end of the control means.

The distributor 47 of oil under pressure comprises a cylindrical sleeve 49 having, at the end thereof adjacent the headstock P, a flange 50 which is connected to a flange 52 of the spindle B by screws 51. The other end of this sleeve 49 is provided with three blind tapped holes 53 which receive screws 54 extending through a ring 55 provided with a cylindrical skirt 56.

The ring 55 comprises three pairs of radial passageways 57 which communicate with three pairs of axially extending blind passageways $58^a$, $58^b$ (see also FIG. 4) in the sleeve 49. The pairs of radial and axial passageways are angularly spaced 120° apart.

The three passageways $58^a$ communicate with each other by way of an annular groove $59^a$ and the three passageways $58^b$ communicate with each other by way of a second groove $59^b$, these grooves being provided in the inner face of an inner sleeve 60 which surrounds the sleeve 49. The latter is supported by a pair of rolling bearings 61.

The inner sleeve 60 further comprises two radial apertures $62^a$, $62^b$ which are tapped and communicate with the annular grooves $59^a$, $59^b$. Two connections $63^a$, $63^b$ for supplying oil under pressure are respectively screwed into the apertures $62^a$, $62^b$. These connections extend through radial apertures 64 in an outer ring 65 which surrounds the inner sleeve, the flange 50 and the skirt 56 owing to the provision of two annular ledges 66 and 67 each of which has an oil-retaining labyrinth.

The sleeve 60 has a portion 68 of larger diameter whose outer face comes in contact with the inner face of the ring 65. A chamber 69 is provided in the latter for receiving oil and discharging the latter to the sump of the lathe by way of a connection 70 provided for this purpose.

The control device (see also FIG. 4) comprises an outer ring 71 and an end ring 72.

The ring 71 is connected to three tapped blocks 73 in the shape of an annular segment by pairs of screws 74. These blocks 73 are angularly spaced 120° apart and are so disposed that they partly cover each of three pairs of axially extending apertures $75^a$, $75^b$ which communicate with the radial passageways 57. The control sleeve 45 has at one end a flange 76 in which are provided apertures $76^a$ receiving three screws 77 which cooperate with tapped holes provided in a ring 78 encompassing the sleeve 45. This ring has two peripheral lateral grooves in which sealing elements 79 are disposed. Three axially extending recesses 80 are provided for inserting screws 54 in the ring 55.

Three movable blocks 81 in the shape of annular segments are connected to the ring 78 by pairs of screws 82.

The ring 72 is connected to the ring 75 by screws 83 and thus completes the assembly of the control device.

The operation of the clamping device shown in FIGS. 1–6 will now be described. Although the device described hereinbefore is of particular utility in the clamping or gripping of irregularly-shaped articles or work-pieces, it permits a clamping in respect of the three following cases:

Concentric clamping: the surface to be machined is concentric relative to the axis X—X of the article to be machined, the latter having a cylindrical shape.

Eccentric clamping: the surface to be machined is eccentric relative to the axis X—X of the article, the latter also having a cylindrical shape.

A floating-jaw clamping: the article to be machined has an irregularly-shaped outer surface.

It will be understood that in each of these cases the surface to be machined is cylindrical and concentric relative to the axis X—X of the chuck, that is, with the axis X—X of the general movement of rotation of the lathe.

(1) CONCENTRIC CLAMPING (SEE FIG. 5)

For this purpose, a tubular sleeve 84 (shown in dot-dash line in FIG. 3) is inserted in the chuck M. The sleeve 84 has two coaxial cylindrical portions 85, 86 of different outside diameters and a flange 87 for securing the sleeve to the body.

The article to be machined having been inserted in the centre bore of the chuck M, that is, inside the sleeve 84, the jaws m are roughly positioned relative to the jaw carriers 6$^a$, 6$^b$, 6$^c$, the jaws including a series of grooves complementary to the grooves 11 which thus allows the clamping of a wide range of different diameters.

Oil under pressure is then supplied to the passageway 58$^b$ by way of the connection 63$^b$ and the pressure is transmitted to the movable blocks 81 in the direction of arrow F$_1$ (see FIG. 4). This rotates the ring 78 relative to the spindle B of the lathe about the axis X—X and consequently rotates the sleeve 45 relative to this spindle. This rotation is transmitted to the plate 29, which is rigid with the sleeve 45, and the ring 27 and the control plate 17 are rotated through abutments 26 which bear against the respective lateral walls of the recesses 32. As the plate is held in a coaxial position relative to the body 1 by the sleeve 84, it rotates about its axis and causes the blocks 21$^a$, 21$^b$ and 21$^c$ to move radially owing to the effect of the ribs 20 which have the shape of an arc of a spiral.

As the blocks 21 pivot in the jaw carriers 6$^a$, 6$^b$, 6$^c$, the latter and the jaws are also driven radially inwardly and the force produced by the hydraulic pressure causes the article or work-piece to be clamped.

The article is unclamped by applying a pressure of oil against the opposed sides of the blocks 81 (the oil being supplied by way of the connection 63$^a$) and rotating the control plate in a direction opposed to that of arrow F$_1$.

It can be seen that the clamping and unclamping of the article are independent of the general movement of the chuck M and of the spindle B of the lathe owing to the relative clamping and unclamping movement of the sleeve 45 and of the spindle B.

(2) ECCENTRIC CLAMPING (SEE FIG. 6)

For this purpose, the sleeve 84 is replaced by an eccentric sleeve (not shown) whose two portions correspond respectively to the bore 2 and the opening 18 and are eccentric to the extent of the desired offset.

The force produced by the oil under pressure causes the plate 29 to rotate so that the control plate, which is rendered eccentric by the effect of the eccentric sleeve, transmits this movement to the blocks 21$^a$–21$^c$, the offsetting of the plate 17 being allowed by the clearance between the abutments 26 and the lateral walls of the recesses 32.

Clamping and unclamping is effected by supplying oil under pressure respectively to the connections 63$^b$ and 63$^a$ in the manner described hereinbefore.

(3) FLOATING-JAW CLAMPING

This occurs when the article or work-piece to be machined has an irregularly-shaped outer face and the surface to be machined is not concentric with the outer face. In this case, the sleeve 84 is advantageously replaced by an axial positioning point inserted in a cavity previously machined in the article. The jaw carriers 6$^a$ . . . 6$^c$ can consequently move independently. The oil pressure exerted on the blocks 81 causes the sleeve 45 to pivot in the manner described hereinbefore. As the plate 29 and consequently the plate 17 are driven in rotation, the jaw carriers 6$^a$ . . . 6$^c$ are shifted radially and drive the jaws m. When the jaws bear against the outer face of the article to be machined, the latter is held stationary owing to the reaction of the positioning point on which the article to be machined is centered. As the movement of rotation of the plate 29 is continued, the two other jaws come in contact with the outer face of the article and the control plate 17 is then shifted radially in seeking the appropriate clamping position thereof. The jaws are then clamped against the article with equal force.

The positioning point required for this floating-jaw clamping can be fixed relative to the chuck or axially movable. The latter case occurs when the article must be machined with an axial reference.

The oil pressure can be produced by a conventional hydraulic unit provided on the machine tool, this pressure being 5–30 bars, depending on the utilization.

The clamping device according to the invention has several advantages over known devices of this type.

The clamping is irreversible, even in the event of breakage of the element connecting the chuck to the control means, owing to the shape, the position and the curvature of the ribs 20$^a$–20$^c$ of the control plate.

The ribs 20$^a$–20$^c$ and the blocks 21$^a$–21$^c$ have very large surfaces of contact and this precludes wedging and wear.

It is possible to replace the control device D by another control device capable of producing a rotative force about the axis X—X of the chuck.

Further, if it is desired to achieve solely a concentric clamping of the article to be machined, it is possible to employ a clamping chuck in which is disposed solely a control plate 17 connected to a control device, the ring 27 and plate 29 being in this case omitted if desired. In this case, the control plate 17 is centered in the cylindrical cavity 3.

FIGS. 7–11 show a particular embodiment of the invention, in particular for effecting a concentric or eccentric clamping of the articles to be machined.

To achieve a concentric or eccentric clamping of cylindrical articles there was employed in the embodiment described hereinbefore, a centering sleeve accessory which was either ececntric or concentric and was permanently inserted in the bores 2 and 18 of the control plate 17 and thus controlled, by its position relative to the body 1, the required radial disposition of the jaw carriers 6$^a$–6$^c$ and consequently that of the jaws themselves. It will be understood that the useful diameter of the bore of the chuck is limited in this case.

According to the embodiment shown in FIGS. 7–11, the centering sleeve (indicated in dot-dash line in these FIGURES and designated by the reference character M$^a$) is employed only for achieving an initial positioning of the jaws. These sleeves M$^a$ are in the form of a perfectly cylindrical tube or they have two eccentric cylindrical portions. During the concentric or eccentric centering operation, these sleeves extend out of the chuck so that the jaws can be applied against their outer face. After this concentric or eccentric centering operation, the centering sleeve is withdrawn from the bore of the chuck so as to leave the entire diameter of the bore 2 free for receiving the article to be machined.

For this purpose, there is provided a centering device having three cranks 101 provided on the periphery of the body 1 and evenly angularly spaced apart (FIG. 8). The body 1 comprises three axially extending apertures 102 which communicate with the cavity 3 and in which the cranks 101 are respectively inserted.

With more particular reference to FIGS. 7 and 11, it can be seen that each crank 101 comprises a cylindrical base 103 with which are integral, at the rear, an eccentric portion 104 terminating in a bearing face 105 and at the front end, a split portion 106 in which is provided a cavity 107. The axis of the latter coincides with the axis of the base 103. The cavity 107 comprises a screw-threaded wall 108 and a frustoconical portion 9. The latter can receive a countersunk-head screw 110.

The bearing face 105 is journalled in a bore 111 in a positioning shoe 112 which has a bearing face 113. The shoe 112 bears against an abutment 114 formed on the eccentric portion 104.

The front face of the crank 101 has two radial aligned notches 115 which are adapted to receive a screwdriver for rotating the crank.

The operation of the centering device will be clear from FIGS. 8–10. In FIG. 8, the control plate is exactly centered relative to the X—X of the chuck. To achieve this centering, there is initially inserted in the latter a centering sleeve M\* which is perfectly cylindrical and against which the jaws are applied. This is effected in rotating the control plate through the control sleeve 45. The control plate 17 then coaxially positions the jaws about the axis of the chuck. Thereafter, the shoes 112 are moved towards the plate 17 so that their bearing faces come in contact with its edge. The locking screws 110 are then tightened so that the portions of the split portion 106 of each crank 101 move apart and lock the respective positioning shoes 112. The plate is thus positioned by the shoes 112. It is now possible to unclamp the jaws by means of the sleeve 45, the control plate ensuring that the jaws are always shifted coaxially relative to the axis of the chuck. The sleeve M\* can now be withdrawn and replaced by the article to be machined. As the latter is clamped by another rotation of the control plate, it is perfectly centered.

For clamping a cylindrical article or work-piece on which it is desired to machine a surface which is eccentric relative to the axis of the article, there is inserted in the chuck a centering sleeve having a portion engaged in the bore 2 which is eccentric to the desired extent (FIG. 9). The procedure is then the same as that described hereinbefore.

FIG. 10 illustrates the case in which the shoes are completely shifted away from the edge of the plate 17, the latter consequently floating.

The improvement in the clamping device according to FIGS. 7–11 therefore permits a very precise centering of the article to be machined, the position of the centering depending practically solely on the machining of the centering sleeves employed for positioning the jaws.

It will be observed that the cranks 101 and the shoes 112 are subjected to no stress since the clamping of the articles to be machined is achieved by means of the jaws themselves.

Although specific embodiments of the invention have been described, many modifications and changes may be made therein without departing from the scope of the invention as defined in the appended claims.

Having now described my invention what I claim as new and desire to secure by Letters Patent is:

1. A clamping device for clamping articles to be machined on machine tools, said device comprising a rigid body having a centre opening and a cavity, at least one clamping dog located in a radial recess in said body and radially slidable relative to the axis of said opening, said clamping dog having a cylindrical aperture therein, a control plate freely disposed in said cavity of said body and having a centre opening communicating with said opening in said body, said plate having at least one rib in the shape of an arc of a spiral, a cylindrical element slidable on said rib and engaged in said cylindrical aperture in said dog, the axis of said aperture being parallel to the axis of said opening in the body, control means rigid with said control plate for imparting thereto a movement of rotation about the axis of said body and relative to the latter, whereby said rotation shifts said rib relative to said cylindrical element and said cylindrical element is shifted radially and radially shifts said dog, said control plate being disposed between the bottom of said cavity and a support ring having an axis which is parallel to the axis of said body, said support ring being freely rotatatble in said cavity and comprising two diametral recesses in which are inserted respectively a pair of radial tabs of a ring connected to rotate with said control plate and, with angular play, diametrally opposed projecting portions on the face of said control plate opposed to said rib.

2. A device as claimed in claim 1, wherein said control means are hydraulic and comprise means defining an annular chamber and comprising a ring which is connected to rotate with said control plate and a cylindrical element encompassing said ring, said ring and said cylindrical element comprising respectively at least one radial projecting portion, said portions dividing said annular chamber in separate cavities with which passageways for oil under pressure respectively communicate.

3. A device as claimed in claim 2 combined with a lathe having a spindle, said ring of said control means being connected to one end of a tubular sleeve which extends coaxially through the spindle of the lathe and is connected to said control plate at its other end.

4. A device as claimed in claim 1, comprising a centering device having at least one crank journalled in said body of said clamping device and comprising an eccentric bearing portion on which is rotatably mounted a positioning shoe having a bearing surface which cooperates with the peripheral edge of said control plate, said crank being provided with locking means for rendering it stationary relative to said body.

5. A device as claimed in claim 4, comprising three of said cranks which are evenly spaced apart along the periphery of said body.

6. A device as claimed in claim 4, wherein each crank comprises a base integral with an eccentric bearing portion of said shoe, and, at the end remote from said base, a radially split portion, said locking means comprising for each crank a countersunk head screw which engages in a frustoconical opening in said split portion.

References Cited

UNITED STATES PATENTS

| 1,263,894 | 4/1918 | Hottinger | 279—114 |
| 1,441,803 | 1/1923 | Hay | 279—114 |
| 2,687,308 | 8/1954 | Highberg et al. | 279—123 |

LESTER M. SWINGLE, Primary Examiner

D. D. EVENSON, Assistant Examiner

U.S. Cl. X.R.

279—114